Sept. 30, 1924.   1,510,257
J. W. CRIBBINS
DEVICE FOR TOWING AUTOMOBILES
Filed Oct. 24, 1923
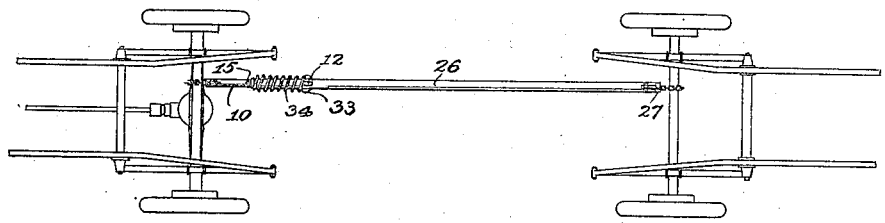
Fig. 1
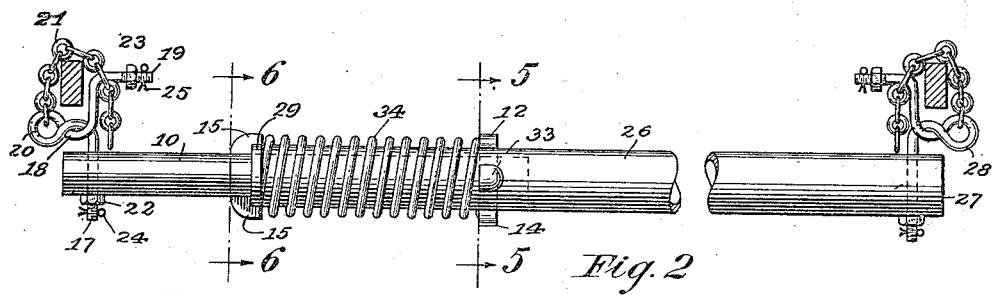
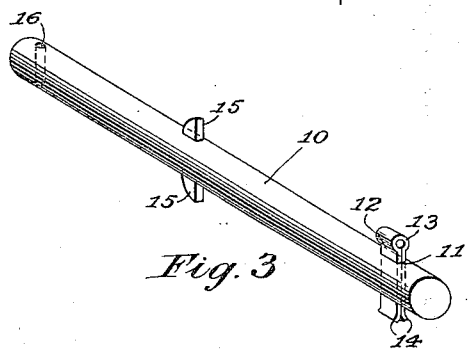
Fig. 3
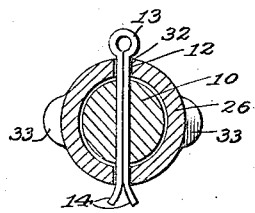
Fig. 5
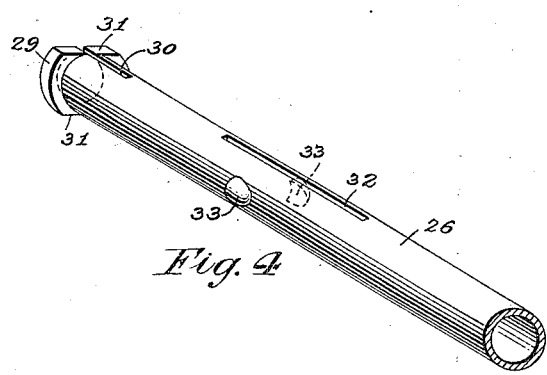
Fig. 4
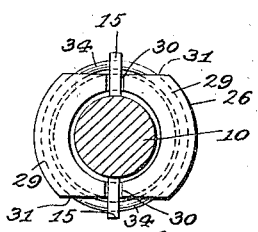
Fig. 6
INVENTOR
John W. Cribbins
BY H. G. Manning
ATTORNEY Patented Sept. 30, 1924.

1,510,257

UNITED STATES PATENT OFFICE.

JOHN W. CRIBBINS, OF DERBY, CONNECTICUT.

DEVICE FOR TOWING AUTOMOBILES.

Application filed October 24, 1923. Serial No. 670,458.

*To all whom it may concern:*

Be it known that I, JOHN W. CRIBBINS, a citizen of the United States, and a resident of Derby, county of New Haven, and State of Connecticut, have invented certain new and useful Improvements in Devices for Towing Automobiles, of which the following is a specification.

This invention relates to automobile towing devices and more particularly to a towing pole composed of two telescoping sections resiliently connected together.

One object of the invention is to provide a towing pole having a double-acting compression spring adapted to serve as a shock absorber.

A further object is to provide a device of the above nature which will be simple, cheap to manufacture, easy to install and manipulate, and very efficient and durable in use.

With these and other objects in view, there has been illustrated on the accompanying drawing the preferred form in which the invention may be conveniently embodied in practice.

Fig. 1 represents a plan view of the towing pole, as it appears when in operating position connected to two vehicles.

Fig. 2 is a side view of the device, partly in section and with parts broken away, as it appears when connected to the towing vehicle and the vehicle being towed.

Fig. 3 is a perspective view of the inside plunger member.

Fig. 4 is a similar perspective view of the outer tubular member.

Fig. 5 is a sectional view of the assembled plunger and tubular member, taken along the line 5—5 of Fig. 2, looking in the direction of the arrows.

Fig. 6 is a similar sectional view taken along the line 6—6 of Fig. 2, looking in the direction of the arrows.

Referring now to the drawing in which like reference numerals denote corresponding parts throughout the several views, the numeral 10 indicates an inner plunger member preferably constructed from solid cylindrical stock. The plunger 10 is provided near one end with a longitudinal slot 11 adapted to receive a detachable locking key member 12. The key member 12 is preferably formed from a strip of sheet metal with its ends brought together in flat contact within the slot 11, having an intermediate enlarged loop 13 and a pair of diverging extremities 14.

The plunger member 10 is provided near its central portion with a pair of oppositely disposed rear spring-holding lugs 15, said lugs having vertical front edges and curved rear edges, as clearly shown in Fig. 3. The inner plunger member 10 is apertured at 16 to receive the transverse threaded end 17 of a connecting member 18, the latter being preferably constructed from a metal rod. The other end of the connecting member 18 is also threaded and is turned backwardly at 19 parallel to the plunger 10. Between its threaded ends 17 and 19, the connecting member 18 is twisted upon itself to form a loop 20, said loop being connected to the end link of a chain 21 which in turn is adapted to be looped around the rear frame or other rigid part of the towing vehicle, and is adjustably connected to the threaded end 19 as clearly shown in Fig. 2. The connecting member 18 is securely attached to the plunger 10 and to the chain 21 by means of nuts 22 and 23 and cotter pins 24 and 25 located on the threaded ends 17 and 19 respectively.

An outer tubular member 26, which is preferably made considerably longer than the inner plunger 10, is loosely telescoped about the inner plunger 10 and is provided at its rear end 27 with a connecting member 28 similar in all respects to the connecting member 18 preferably described. The connecting member 28 is adapted to encircle the front frame of the vehicle being towed, which may be either another automobile, or a trailer. The tubular member 26 is preferably cylindrical in shape, and is provided with a flange 29 at its front end, said flange and the end of the tube being slit at 30 to provide a guideway for the holding lugs 15 so that they may slide freely back and forth therein. The flange 29 is provided with a pair of parallel flat edges 31 on opposite sides, as clearly shown in Fig. 4, and in order to permit sliding movement of the key 12, the outer tubular member 26 has a pair of oppositely disposed longitudinal guide slots 32.

A pair of lugs 33 having vertical rear faces and curved forward portions, are provided on the outside of the tubular member 26, at points spaced ninety degrees from the slots 32. The lugs 33 serve to limit the motion of a spiral compression spring 34 which is arranged outside of the tubular member 26 between the key 12, the lugs 33, the flange 29, and the lugs 15.

In operation, when it is desired to assemble the device, the tubular member 26 will first be telescoped about the plunger 10. The key 12 will then be slipped into the position shown in Fig. 3. The connecting members 18 and 28 will then be attached to the front and the rear vehicles, respectively, by means of the adjustable chains, as shown. When the front car is started, the towing pole will be put under tension and the plunger member 10 will pull upon the spring 34, compressing it between the flange 29 and the key 12. When, however, the front car is backing or is slowing up, the rear car or trailer by reason of its momentum will exert a pressure upon the front car putting the towing pole under compression and causing the spring 34 to be again compressed this time between the lugs 33 and 15. It will thus be seen that the spring 34 constitutes a double-acting shock-absorber serving to take up the strains from the towing pole both under tension and under compression, which strains would otherwise be transmitted to the towing vehicle and the vehicle being towed.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent is:

1. In a towing device for connecting two vehicles, a tubular member connected to one vehicle, a plunger member telescoped within said tubular member and connected to the other vehicle, a spiral spring surrounding said tubular member, said plunger member having a longitudinal slot near its end, a key fitted into said slot to engage the spring when the device is under tension and a lug on said tube to engage the spring when the device is under compression.

2. In a towing device for connecting two vehicles, a pair of relatively slidable members, said members having their outer ends connected to said vehicles respectively, a spring surrounding said slidable members, means for engaging the spring to prevent it from extension when said device is under tension, and means to prevent it from extension when said device is under compression, said latter means including a stop and a detachable key on one slidable member, said key being formed from a U-shaped strip of metal, having its sides parallel and disposed within a slot in the slidable member in which it is secured.

3. In a towing device for connecting two vehicles, a pair of relatively slidable members connected at their outer ends to said vehicles respectively, a spiral compression spring surrounding the inner ends of said slidable members, one of said slidable members having a pair of spaced slots to receive a key and a lug on the other slidable member, said key being detachable and serving to engage the spring when said device is under tension, and said lug serving to engage said spring when said device is under compression.

4. In a towing device for connecting two vehicles, a pair of relatively slidable members connected to said vehicles respectively, the inner ends of said slidable members having a resilient double-acting connection, means at the end of each slidable member for connecting it to one vehicle, said means comprising a metal rod having its terminals threaded, one of said terminals being secured to said slidable member, the portion of said metal rod between its terminals being twisted upon itself to form a loop, a chain connecting said loop with the free terminal of said rod, said chain being adapted to encircle the axle or other rigid part of the vehicle.

In testimony whereof, I have affixed my signature to this specification.

JOHN W. CRIBBINS.